(12) United States Patent
Roblin et al.

(10) Patent No.: US 11,458,680 B2
(45) Date of Patent: Oct. 4, 2022

(54) CALIBRATING A HEAD SYSTEM OF A POWER RADIATION SOURCE OF AN ADDITIVE MANUFACTURING DEVICE

(71) Applicant: AddUp, Cebazat (FR)

(72) Inventors: Alexandre Roblin, Cebazat (FR); Jean-Pierre Nicaise, Cebazat (FR)

(73) Assignee: ADDUP, Cebazat (FR)

( * ) Notice: Subject to any disclaimer, the term of this patent is extended or adjusted under 35 U.S.C. 154(b) by 197 days.

(21) Appl. No.: 16/624,551

(22) PCT Filed: Jun. 19, 2018

(86) PCT No.: PCT/EP2018/066309
§ 371 (c)(1),
(2) Date: Dec. 19, 2019

(87) PCT Pub. No.: WO2018/234336
PCT Pub. Date: Dec. 27, 2018

(65) Prior Publication Data
US 2020/0215759 A1    Jul. 9, 2020

(30) Foreign Application Priority Data

Jun. 19, 2017 (FR) ...................................... 1755571

(51) Int. Cl.
*B29C 64/20* (2017.01)
*B29C 64/264* (2017.01)
(Continued)

(52) U.S. Cl.
CPC ............ *B29C 64/20* (2017.08); *B29C 64/264* (2017.08); *B29C 64/393* (2017.08);
(Continued)

(58) Field of Classification Search
CPC ... B29C 64/393; B29C 64/264; B29C 64/245; B29C 64/20; B33Y 50/02; B33Y 30/00; B22F 10/31
See application file for complete search history.

(56) References Cited

U.S. PATENT DOCUMENTS

| 5,832,415 A | 11/1998 | Wilkening et al. |
| 6,175,413 B1 | 1/2001 | Lucas |
| (Continued) | | |

FOREIGN PATENT DOCUMENTS

| CN | 101823181 A | 9/2010 |
| DE | 10 2015 224 963 B3 | 4/2017 |
| EP | 1 048 441 A1 | 11/2000 |

OTHER PUBLICATIONS

International Search Report dated Jun. 29, 2018, in corresponding PCT/EP2018/066309 (6 pages).

*Primary Examiner* — Jerzi H Moreno Hernandez
(74) *Attorney, Agent, or Firm* — Venable LLP (57) ABSTRACT

A kit for the calibration of a head system of a power radiation source of an additive manufacturing device comprises: a calibration plate having a plurality of reference marks, and a firing support made from at least one material sensitive to the radiation of the source, this support leaving the reference marks of the calibration plate visible when it is in place thereon, characterized in that the firing support comprises a plurality of windows distributed in such a way as to become superposed with the various reference marks of the calibration plate and leave them visible when the firing support is in place on the calibration plate. There is also a method for calibrating such a system.

10 Claims, 10 Drawing Sheets

(51) Int. Cl.
*B29C 64/393* (2017.01)
*B33Y 50/02* (2015.01)
*B29C 64/245* (2017.01)
*B29C 64/209* (2017.01)

(52) U.S. Cl.
CPC .......... *B29C 64/209* (2017.08); *B29C 64/245* (2017.08); *B33Y 50/02* (2014.12)

(56) References Cited

U.S. PATENT DOCUMENTS

| | | |
|---|---|---|
| 6,483,596 B1 | 11/2002 | Philippi et al. |
| 2003/0192868 A1 | 10/2003 | Dietrich et al. |
| 2010/0176539 A1 | 7/2010 | Higashi et al. |
| 2012/0139166 A1* | 6/2012 | Abe ................. B22F 10/20 264/497 |
| 2014/0333931 A1 | 11/2014 | Lu et al. |
| 2015/0100149 A1 | 4/2015 | Coeck et al. |
| 2018/0290242 A1 | 10/2018 | Blaschka et al. |
| 2019/0047228 A1* | 2/2019 | Brown ................. G02B 26/101 |
| 2020/0122404 A1 | 4/2020 | Roblin et al. |

* cited by examiner

CALIBRATING A HEAD SYSTEM OF A POWER RADIATION SOURCE OF AN ADDITIVE MANUFACTURING DEVICE

The present invention relates to selective additive manufacturing.

More specifically, it relates to the calibration of the control of a head system of a power radiation source of an additive manufacturing device.

OVERALL TECHNICAL FIELD AND PRIOR ART

Selective additive manufacturing consists in creating three-dimensional objects by consolidating selected zones in successive layers of powdered material (metallic powder, ceramic powder). The consolidated zones correspond to successive cross sections of the three-dimensional object. Consolidation is performed, layer by layer, by total or partial selective melting performed with a focused source of radiation, such as an optical source (high-power laser for example) or else a particle beam source (for example a beam of electrons in the technology known as EBM or "Electron Beam Melting" according to the terms of the art).

In what follows, reference will be made chiefly to optical sources (such as used in SLM, or "Selective Laser Melting" according to the terminology of the art).

However, it can be applied using any other type of radiation.

Figure 1:
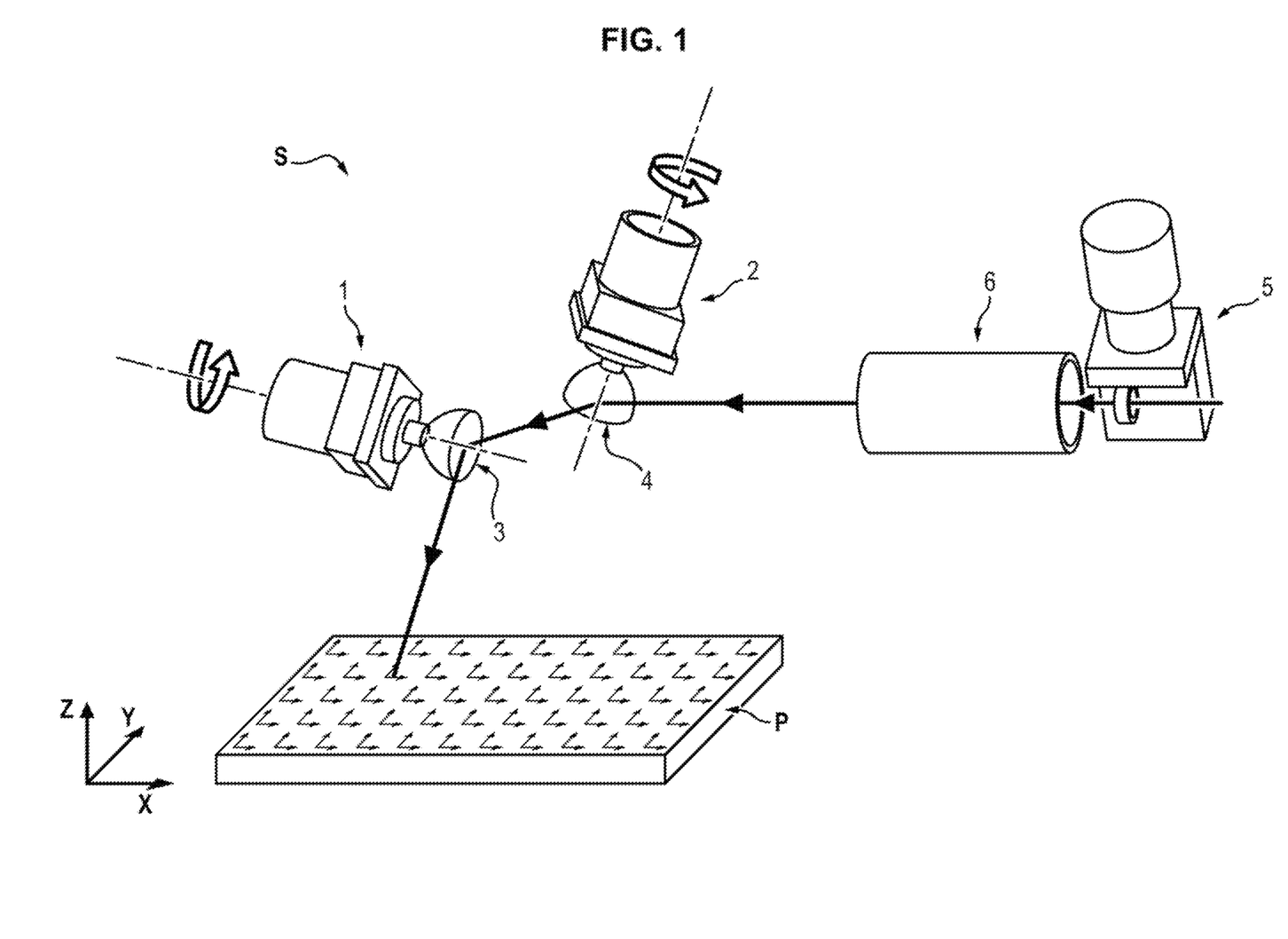
FIG. 1 is a schematic depiction of the optical sequence of a three-axis head of a laser emission source of a selective manufacturing device.

Conventionally, as illustrated in FIG. 1, additive manufacturing devices of the type using an optical source use three-axis head systems S with three galvanometers in order to provide increased precision on the one hand regarding the position of the point of impact on the layer of powdered material and, on the other hand, regarding the focusing of the beam on said layer.

Two galvanometers 1, 2 are used to guide the rotation of two mirrors 3, 4 and make it possible to check the path of the beam leaving the head, so as to check the position of the point of impact of the beam on the powder bed (working plane P) (controlled in X and in Y).

Furthermore, a DFM ("Dynamic Focusing Module" according to the terminology of the art)—comprising a galvanometer, a translation module and a lens—makes it possible, by adapting the translational movement of the said lens, to perfectly adjust the focal point of the beam onto the powder bed (control in Z). FIG. 1 also depicts an objective-lens module 6 which introduces a fixed focus, the DFM module 5 making it possible to modify the focusing upstream.

Indeed it will be appreciated that the better the laser beam is focused on the powder bed, the greater the amount and control over the energy transmitted to the melt point.

Nevertheless, it will be noted that such a three-axis head system S implies two main types of deformation at the powder bed (plane P).

First of all, the focus on the working plane P on which the powder bed is situated varies according to the inclination of the optical beam. As indeed illustrated in FIG. 2, the inclination of the beam is the result of variations in the optical path length (which variations are indicated schematically by $\Delta Z$ in the figure), these variations themselves having to be added to the phenomena caused by the play induced by the mirrors or else by passing through the various windows there might be in the additive manufacturing device.

Figure 2:
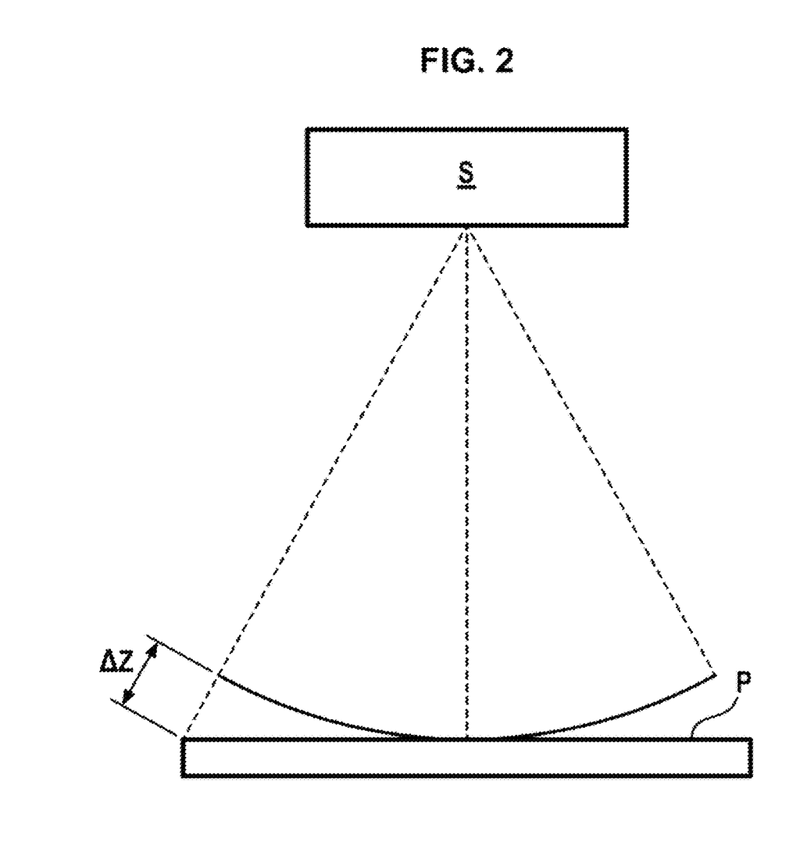
FIGS. 2 and 3 illustrate the main deformations on such a device in the absence of correction.

In the absence of any processing of this geometric offset, the focus across the entirety of the working plane P is therefore not constant.

Figure 3:
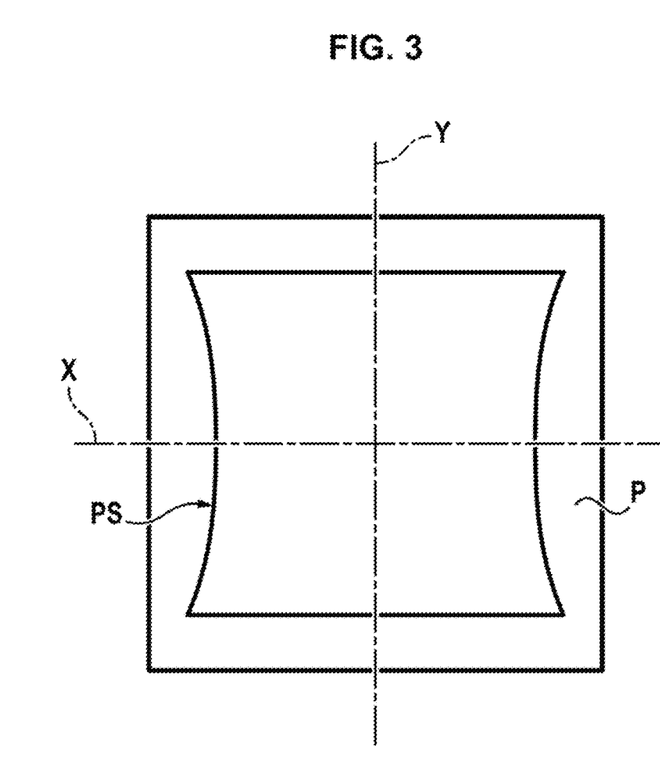

Furthermore, a non-linear deformation in X and in Y in the figures (deformation said to be "pillow-shaped" according to the terminology of the art generally used—shape PS in FIG. 3) is conventionally seen on the working plane P. This deformation is caused by the geometry of the optical path, notably by the position of the mirrors and optics and by their distance from the plate P.

It is conventionally known practice to correct the controls of the heads in order to account for the distortions in X and in Y.

In order to do this, use is made of previously determined dedicated correction tables.

These tables give control differentials via which the control inputs of the three-axis head are corrected. Firings and sweeps of the working plane P by the optical beam are thus performed with positions in X and in Y that are corrected with respect to the powder bed.

In order to determine these correction tables, it is known practice to use calibration plates which bear reference marks. Sequences of optical firings are carried out at predetermined target positions on the plate. A measurement system involving a camera records the position of these markings with respect to the reference frames of reference.

The differentials between the positions of the markings thus made on the calibration plate and the theoretically targeted positions of the firings are used to calculate the corrections that need to be applied to the controls in X and in Y of the optical beam head system.

One example of this approach is described for example in patent EP1048441 or else in patent applications US2015/0100149, US 2010/176539, in which the plate comprises cavities aimed at increasing the contrast between a hole made by firing and its contour, US 2003/192868, U.S. Pat. No. 5,832,415 and US 2014/0333931.

In EP1048441 in particular, calibration employs, on the one hand, a plate bearing the reference marks and, on the other hand, a sheet intended to receive the markings.

The plate is therefore divided into two zones: one that receives the sheet sensitive to the optical beam and the other—not covered by the said sheet—which bears the reference marks.

In U.S. Pat. No. 6,175,413, the calibration of a robotics system is performed with the aid of a plate comprising detection surfaces sensitive to the optical beam, detecting the presence or the absence of the laser beam.

The corrections thus made in X and in Y are not, however, optimal.

Furthermore, the proposed processing does not allow the focusing of the beam on the powder bed to be optimized.

As will be readily appreciated, similar calibration problems also arise with other sources of radiation (EBM source for example).

General Introduction to the Invention

One object of the invention is to propose an automatic calibration solution that makes it possible to optimize the correction applied to the firing.

In particular, one object of the invention is to propose a calibration solution that allows better calibration in X and in Y than in the prior art.

Another object of the invention is to propose a solution that allows the focusing of the source to be calibrated (calibration in Z).

According to a first aspect, to this end, the invention proposes a kit for the calibration of a head system of a power radiation source of an additive manufacturing device, comprising:

a calibration plate having a plurality of reference marks,
a firing support made from at least one material sensitive to the radiation of the source,
this support leaving the reference marks of the calibration plate visible when it is in place thereon,
characterized in that the firing support comprises a plurality of windows distributed in such a way as to become superposed with the various reference marks of the calibration plate and leave them visible when the firing support is in place on the calibration plate.

The kit described above is advantageously supplemented with the various following characteristics taken alone or according to all their technically possible combinations:

the reference marks are distributed over the whole of the calibration plate, the firing support being dimensioned to correspond to the said calibration plate,
the kit comprises mobile optical measurement equipment, the said equipment being able to be moved over the firing support,
the kit comprises a dual-rails support on which the optical measurement equipment is intended to be mounted,
the number of reference marks on the calibration plate is 65×65 or less.

According to a second aspect, the invention also proposes a method for the calibration of a head system of a power radiation source of an additive manufacturing device in which, in order to determine a correction to be applied to the controls of the said system, the following steps are implemented:

positioning in the additive manufacturing device a calibration plate exhibiting a plurality of reference marks,
positioning on this calibration plate of a firing support made of at least one material sensitive to the radiation of the source, this support revealing the reference marks of the calibration plate when it is in place on the latter,
controlling the source in order to mark out the said support with at least one calibration pattern,
capturing at least one image of the said calibration pattern and of at least one reference mark,
determining a correction table on the basis of the image or images thus obtained, characterized in that the plate and the firing support are those of a kit according to the first aspect of the invention,
in that the source is controlled using the head system in order to create on the firing support a marking-out of a plurality of calibration patterns theoretically centred on predetermined theoretical target points, these theoretical target points being distributed over the said firing support in the immediate vicinity of the various windows that leave the reference marks of the calibration plate visible,
in that, during the acquisition step, optical measurement equipment is moved over the firing support in order to capture, for each reference mark of the calibration plate, at least one image of a zone in which are situated, on the one hand, the said reference mark and, on the other hand, the theoretical target position in the immediate vicinity,
and in that, for each reference mark, the image or images thus obtained are processed in order therein to identify a calibration pattern and to determine at least one item of information relating to the said pattern, corrections to be applied to the head system control being determined on the basis of the calibration pattern information determined for the various reference marks.

Such a method is advantageously supplemented by the following various features considered alone or in any technically feasible combination thereof:

for each reference mark, the image or images acquired is/are processed in order to deduce from them the position of the centre of the firing pattern in an orthonormal frame of reference of the said reference mark and to determine the offset between this position and the theoretical target position,
the calibration plate comprises a number of reference marks that is equal to the number of points in the correction table,
in order to determine a correction, processing is used to convert a frame of reference of the calibration plate to a frame of reference associated with the head,
the said processing involves identifying patterns corresponding to two given reference marks on the calibration plate and, from said identification, determining an offset in terms of the translation and an angular rotation between the frame of reference of the calibration plate and a frame of reference associated with the head,
the firing support is turned over and a checking test is performed,
the steps of the method are repeated iteratively until firing patterns exhibiting the expected positional tolerance are obtained.

DESCRIPTION OF THE FIGURES

Further features and advantages of the invention will become more apparent from the following description, which is purely illustrative and non-limiting and should be read in conjunction with the appended drawings, in which:

FIG. 7 illustrates the image in the field of measurement of the camera of the kit of FIG. 4a;

DESCRIPTION OF ONE OR MORE EMBODIMENTS

Calibration Kit

Figure 4A:
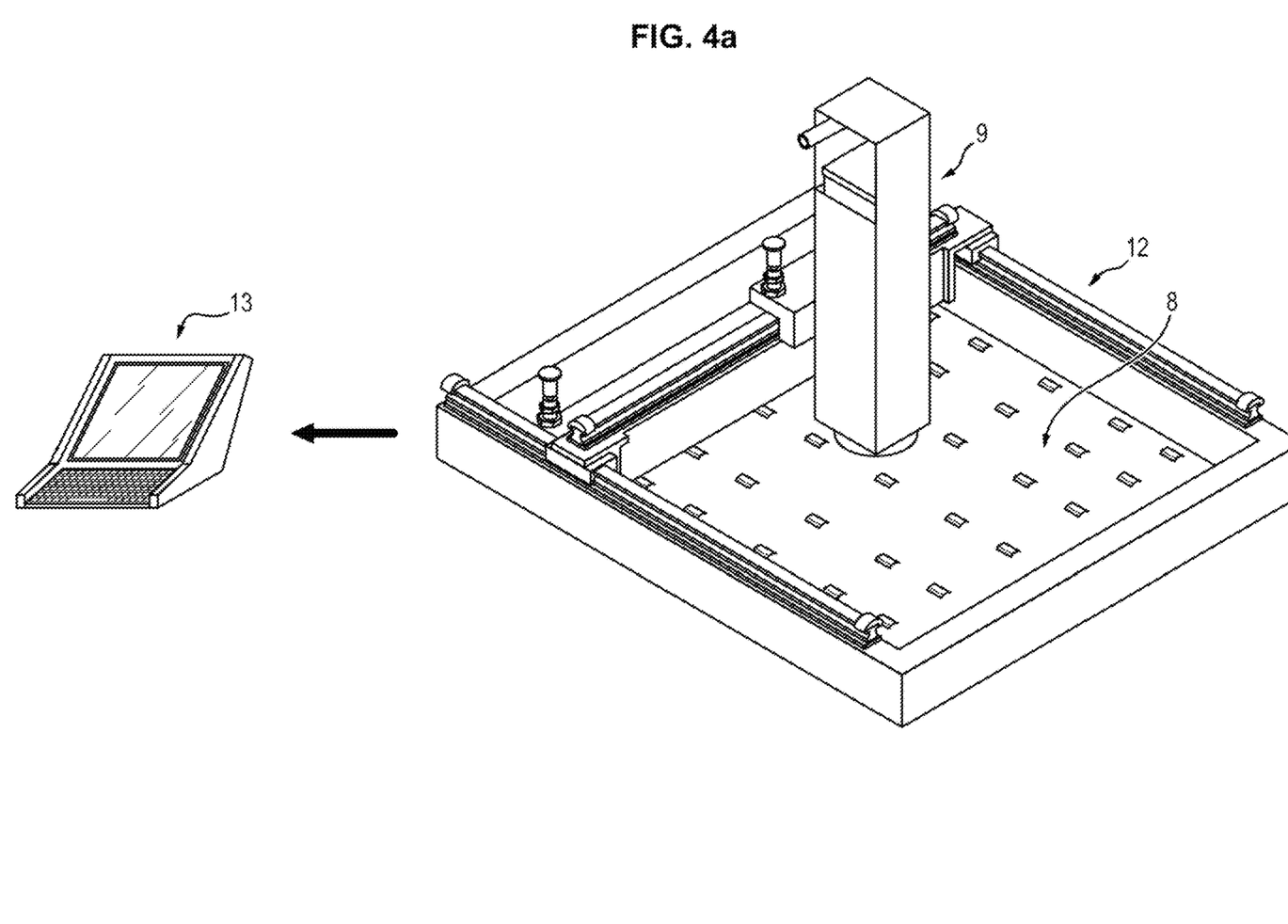
FIG. 4a schematically illustrates an example of a calibration kit (calibration assembly) according to the invention, FIG. 4b itself detailing the elements of the optical kit of this calibration kit.
Figure 4B:
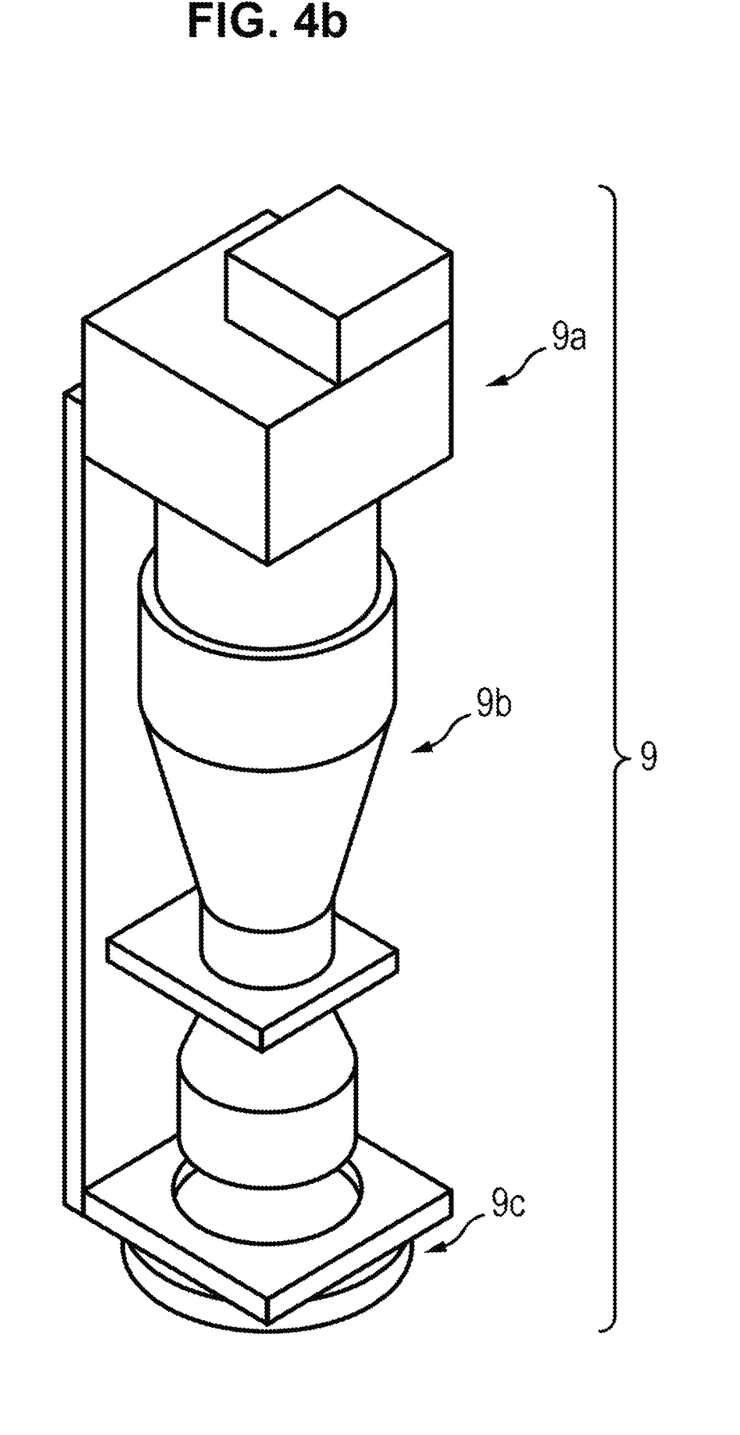
Figure 5:
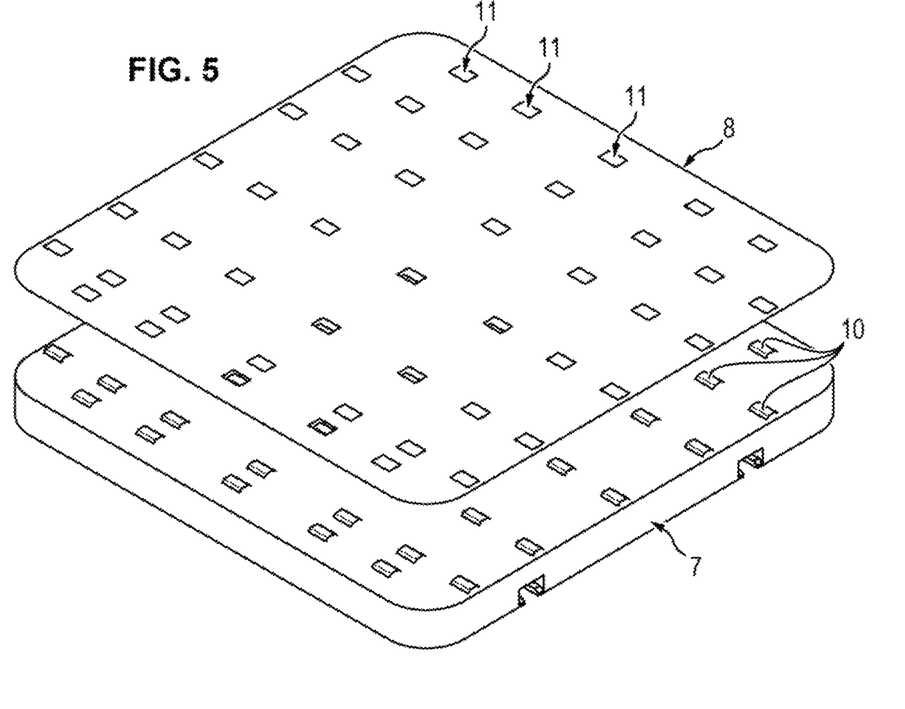
FIG. 5 is a schematic depiction illustrating the superposition of a calibration plate and of a firing support.

The calibration kit of FIGS. 4 and 5 is a kit comprising a reference calibration plate 7 and a firing support 8.

It also comprises checking equipment 9 involving an optical sensor.

The reference plate 7 is a plate which bears a plurality of visible reference marks 10.

These reference marks 10 are distributed over the entirety of the plate at known and checked positions. By way of example, they may be situated near points of a 65×65 matrix intended to be swept completely or partially by the power radiation source during calibration. Of course, other distributions are possible.

At each reference point, the visible marking of the mark 10 is defined by two orthogonal axes, the intersection of which corresponds to the reference point and which define an orthonormal frame of reference on the plate.

The firing support 8 for its part is made up of a tape of a material sensitive to the beam of radiation.

This support 8 has the same dimensions in X and Y as the plate 7 and is positioned thereon during the calibration firings.

This support 8 has a plurality of windows 11 distributed in the same way as the reference marks 10 on the plate 7. When the firing support 8 is in place on the plate 7, the windows 11 are centred on the reference marks 10 which are therefore visible.

The equipment 9 comprises a camera 9a of CMOS or CCD type, an optical objective 9b and a special-purpose lighting system 9c.

The special-purpose lighting system 9c consists, for example, of a ring of light emitting diodes. The camera 9a and the objective 9b allow an image of a resolution that makes it possible to take measurements on the firing support 8 with a near micron-scale tolerance.

This equipment 9 is, for example, incorporated into the selective printing device.

As an alternative, it might be fitted therein only during the calibration phases.

Figure 6:
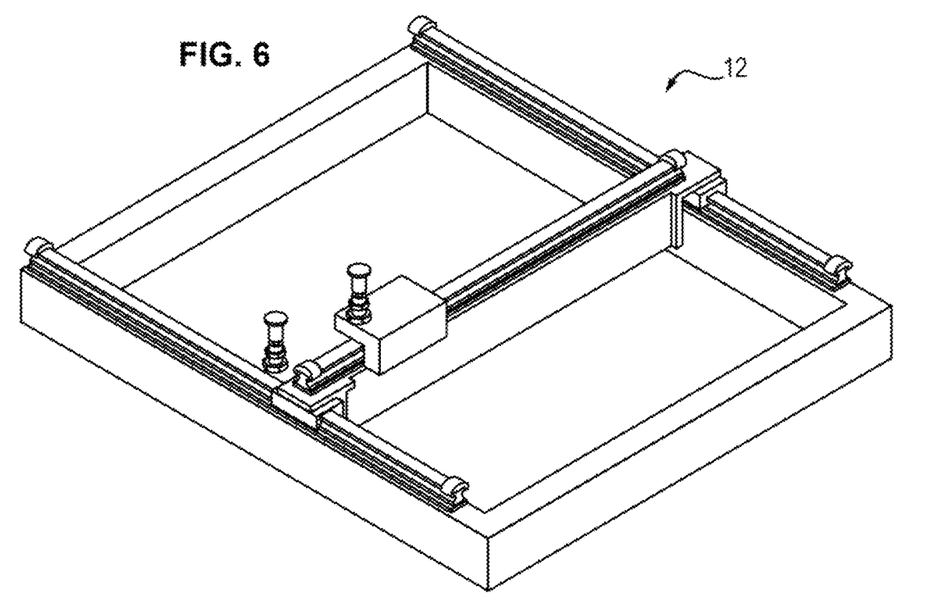
FIG. 6 schematically illustrates a support with dual-axis rails on which support the measurement equipment of the kit of FIG. 4a is intended to be mounted.

The selective-printing manufacturing device incorporates a support 12 for dual-axis rails, as depicted in FIG. 6, which accepts the equipment 9 and the camera 9a. This system 12 allows the equipment 9 and the camera 9a to be guided manually or automatically in X and in Y over the calibration plate 7 and the support 8.

The various images gathered are processed by a processor 13 in order to deduce therefrom the measurements described hereinafter. This processor 13 is, for example, the processor of the selective printing device. It may also be a processor distinct from that of the selective printing device and which exchanges therewith.

Error Measurement

Figure 7:
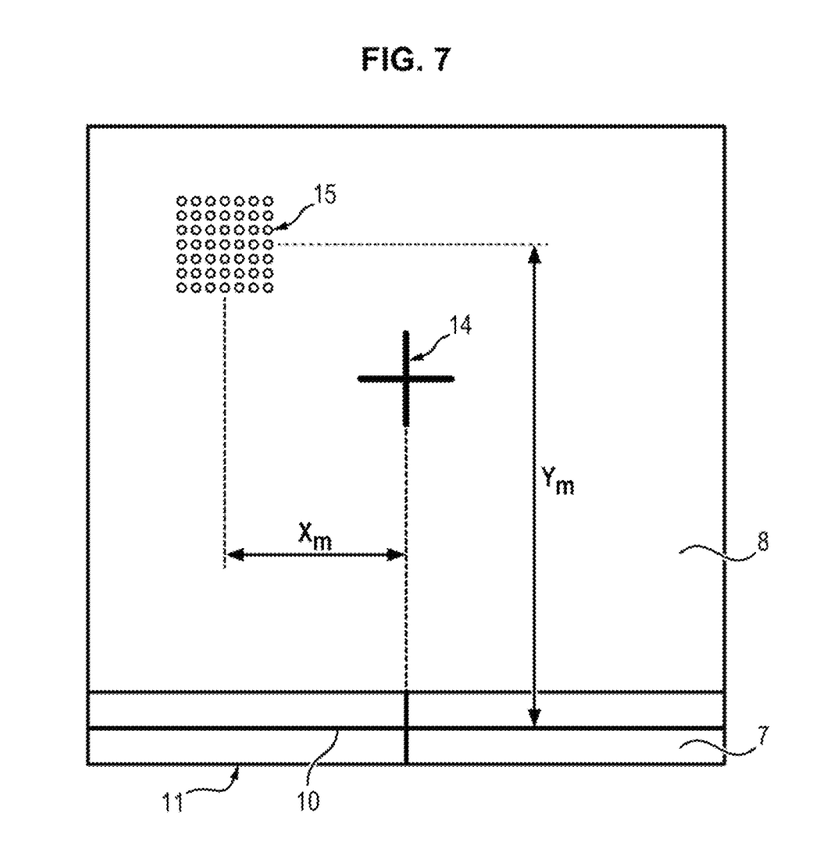

During calibration, the camera 9a captures, for each of the various reference marks 10, an image showing the orthonormal marking-out that corresponds to the said mark 10 (FIG. 7).

The markings-out of each of the reference marks 10 are in fact left visible thanks to the windows 11 in the firing support 8, which may for example be rectangular openings, although of course other shapes are possible.

Such reference markings 10 define, on the calibration plate 7, an orthonormal measurement frame of reference which is used as a reference by the camera 9b.

Prior to image capture, the source and its head system S have been controlled in such a way as to perform, on the support 8, for each reference mark 10, a firing at a given theoretical target position in the vicinity of the corresponding reference mark 10.

This firing is performed as a succession of several firing points distributed along a predefined firing pattern (matrix pattern 15 measuring 7×7 points in the example of FIG. 7).

In FIG. 7, the theoretical target position (not visible) corresponds to the cross 14.

At the end of the firings of patterns that impact on the support 8, images are captured around each reference marking 10.

For each of these markings 10, the image captured of the zone around it is processed by the processor 13 in order therefrom to deduce the position of the centre (midpoint) of the firing pattern 15 in the orthonormal frame of reference of the said marking 10 (position measurements Xm and Ym) and, therefore, the offset of this position with respect to the theoretical target position 14.

Figure 8A:
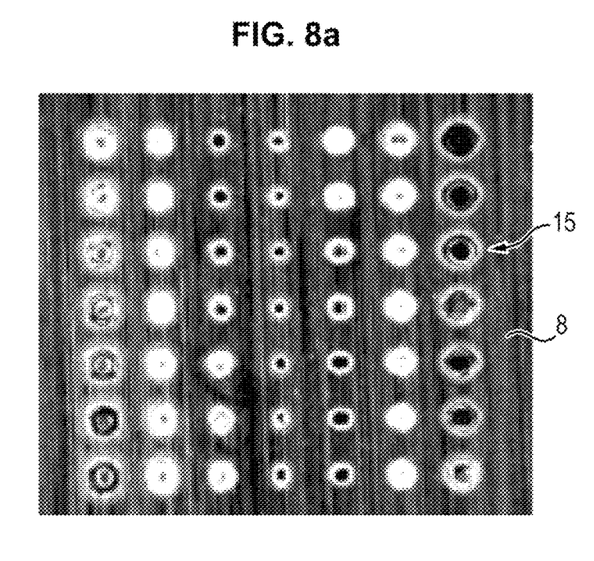
FIG. 8a illustrates the points of impact on the firing support in the region of the calibration pattern.

Furthermore, as illustrated in FIG. 8a, the firings at the various points of the pattern 15 are controlled in such a way as to generate different diameters at the points of impact of the said pattern.

For example, several of these firings are generated with different controls in Z, which means to say with different focus controls. Typically, the Z-control of these various firings is incremented from one point to another in order theoretically to obtain a Gaussian distribution about the midpoint of the pattern.

In the example of FIG. 8a, the Gaussian distribution is a distribution with an axis of symmetry in Y.

As an alternative, this distribution may be Gaussian in both X and Y (distribution according to a two-dimensional Gaussian distribution).

One example of the distribution of the increments is given in the following table. The firing pattern is in the form of a matrix and the control value in Z increases column by column (in this instance from left to right) and row by row (from bottom to top).

| ... | ... | $-4\Delta$ | $+3\Delta$ | ... | ... | ... |
|---|---|---|---|---|---|---|
| ... | ... | $-5\Delta$ | $+2\Delta$ | $+4\Delta$ | ... | ... |
| ... | ... | $-6\Delta$ | $+\Delta$ | $+3\Delta$ | ... | ... |
| ... | ... | $-7\Delta$ | $0$ | $+\Delta$ | ... | ... |
| ... | ... | $-8\Delta$ | $-\Delta$ | $-3\Delta$ | ... | ... |
| ... | ... | $-9\Delta$ | $-2\Delta$ | $+5\Delta$ | ... | ... |
| ... | ... | ... | $-3\Delta$ | $+4\Delta$ | ... | ... |

The central point of increment 0 corresponds to the midpoint of the pattern, while $\Delta$ corresponds to the individual increment value of control in Z. In the case (given solely by way of example) of a 7×7 matrix of firings, it is thus possible to test 49 Z-control values.

Figure 8B:
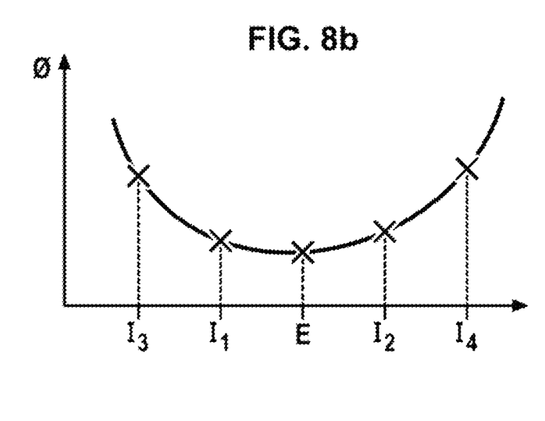
FIG. 8b illustrates a Gaussian distribution of the points of impact and the determination of an extrapolated "waist" point.

Once the pattern has been generated, the processing performed by the processor 13 analyses the distribution of the diameters of the points of impact and on the basis of this distribution determines the point in the zone of the pattern that corresponds to the "waist".

This "waist" point corresponds to a point of impact of smallest diameter or to an extrapolated point extrapolated from the curves of the distribution of the diameters of the points of impact.

In the example illustrated in FIG. 8a, various different points of impact I1 to I4 and a curve G which is the Gaussian best fit through these points have been depicted.

The extrapolated point is the point E corresponding to the minimum of the said Gaussian G.

The control in Z for the point of impact thus selected (or the extrapolated control that corresponds to the extrapolated point thus determined) is then applied as the control for the theoretical target position of the marking (in the form of a correction $\Delta Zm$).

To supplement this, a possible correction to take account of the variation in length of the optical path between this theoretical target point and the point determined as corresponding to the "waist" may also be implemented.

This correction is determined for example by reference to charts that give this additional focusing correction as a function of the measurement of the distance between the theoretical target point and the point of impact of smallest diameter or determined as corresponding to the "waist".

It will be appreciated that such processing is made particularly easier if the points of impact together design a matrix-form calibration pattern. Many other configurations of calibration pattern are of course possible.

The measurements Xm and Ym are then processed in order to deduce therefrom the correction values $\Delta X$ and $\Delta Y$, in bits, needed at the level of the head control system S in order for the pattern 15, in a next calibration firing, to be centred on the target position 14.

In the same way, the correction $\Delta Z$ to be applied to the DFM module in order to correct the focus is determined as a function of Xm, Ym and $\Delta Zm$, and fed back, in bits, to the said module.

As an idea of an order of magnitude, the galvanometers of the three-axis head are typically controlled over 24 bits (which is guidance of each of the axes over $2^{24}$ bits), whereas the step increment in X, Y on a correction grating is distributed over 4225 values (steps of 262 144 bits). The control Z is likewise controlled over 24 bits, the correction table having the same dimension as for X and Y.

It will also be noted that a matrix-form pattern of the type proposed is particularly advantageous and allows precision calibration, both with regard to the position of the firing points and with regard to the focusing of the beam of radiation on the powder bed. Nevertheless, other patterns are possible (matrix-form patterns are distributed with a staggered configuration, circular patterns, elliptical patterns, etc.).

Calibration Steps

In a first step (step 21 in FIG. 9), pre-correction tables in the three axes are loaded into the processor 13.

Figure 9:
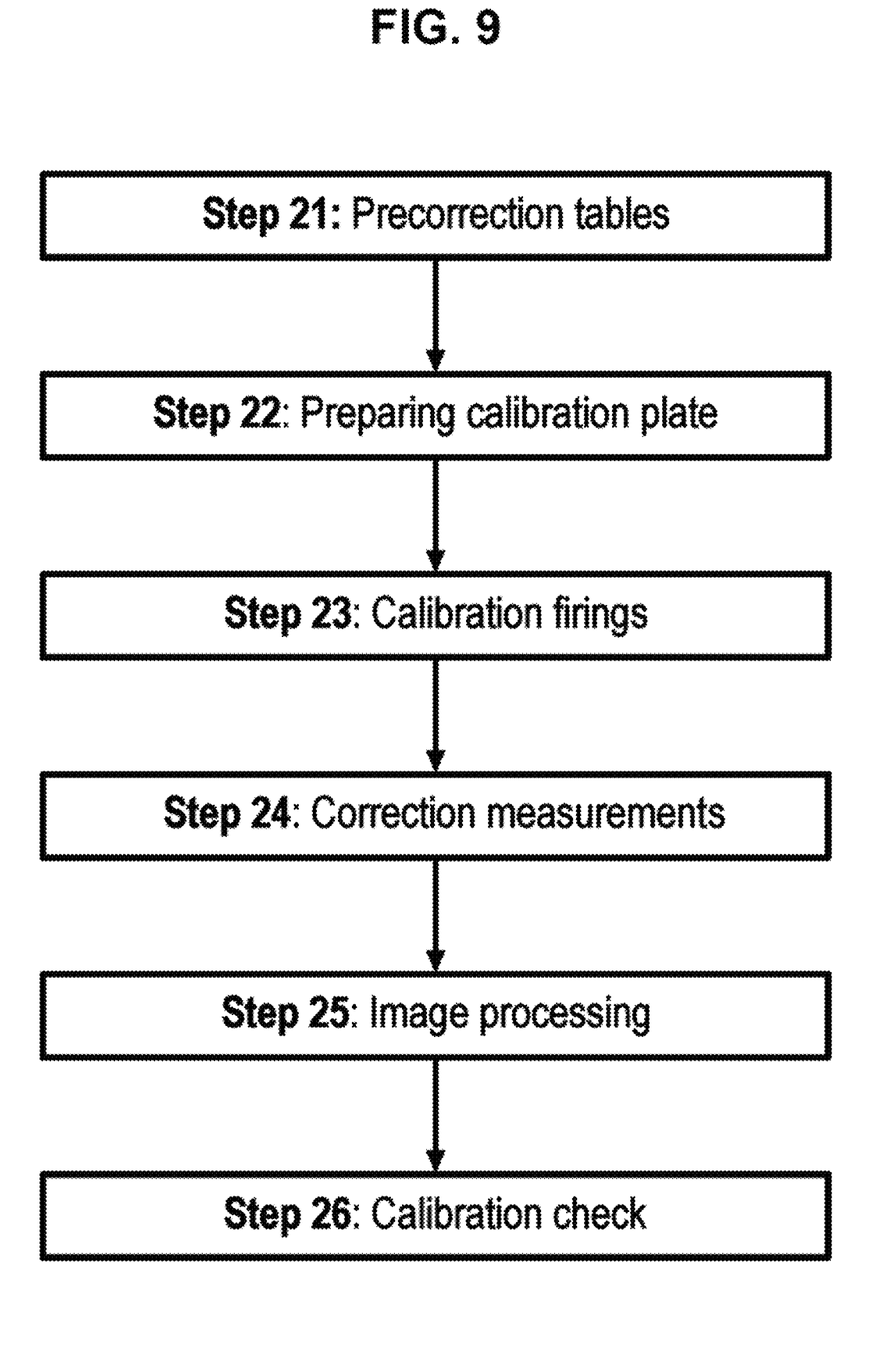
FIG. 9 illustrates various steps in one possible implementation of the method of the invention.

These tables are obtained beforehand using theoretical models. This makes it possible to a large extent to eliminate faults associated with the optical sequence. In this way it is possible to perform the calibration firings in a very confined zone compatible with the field of view of the camera and with sufficient focus for etching.

In a second step (step 22), the plate 7 is installed in the device for manufacturing objects by selective printing, and the firing support 8 is positioned on it. The calibration plate 7 is dimensioned to allow it to be installed easily and directly on the platform-bearing system of the said device.

In a third step (step 23), the beam source and the head are controlled in such a way as to carry out on the support 8 a succession of firings of patterns at various theoretical target points 14.

The theoretical target points are chosen to correspond to points similar to all or some of the reference marks on the calibration plate.

The use of a matrix of theoretical points corresponding to the matrix of points that is used for a correction table makes it possible to limit the influence of the correction.

The number of reference points used may nevertheless be lower than the number of points in the correction table that is to be determined. In such a case, the missing points can be extrapolated from the results relating to the target points.

Figure 10:
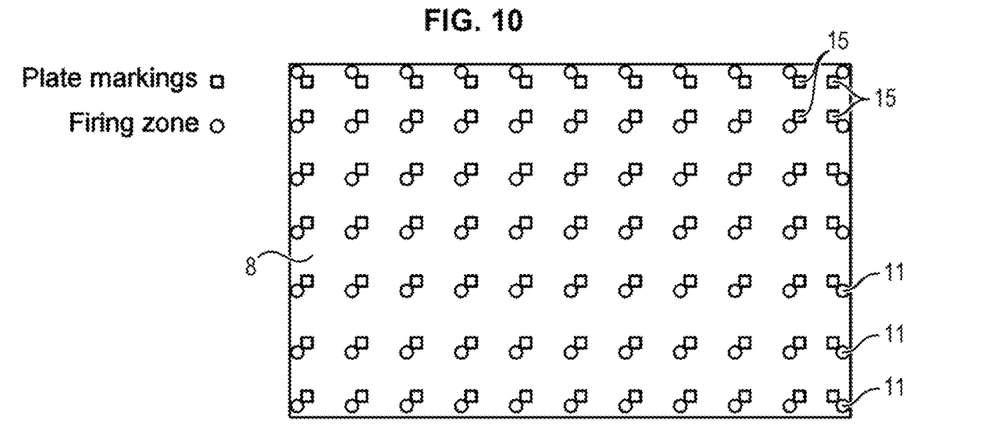
FIG. 10 illustrates a firing support showing the impacts of various firing patterns.

The firings of the patterns are targeted at 7.5 mm on the plate in Y so as to fire onto the material of the support 8 rather than onto the windows 11, so that the impacts are visible on the support 8 and can be measured with the camera 9b (FIG. 10).

In a fourth step (step 24 in FIG. 9), the measurement equipment 9 is introduced into the selective printing device in order to take the optical measurements that allow the corrections.

Using the two-axis support 12, the operator moves the said equipment 9 either by hand or using motorized means in order in succession to capture images of the collection of the various firing points on the support 8. It will be noted that the calibration plate 7 may bear a numbering system in the vicinity of the various reference marks 10 so that the sweep can be done without an order of measurement being imposed on the reference marks.

The images thus captured may be processed in real-time by the processor 13 (step 25) or stored for processing later.

The measurements and processing are performed as follows.

Analysis of an image on a given reference mark makes it possible to determine the coordinates Xm and Ym of the point at the centre (in the middle) of the firing pattern.

It also allows the correction value $\Delta Zm$ to be determined.

The head cannot be mechanically positioned with respect to the calibration plate 7 to within one micron, so the processor 13 performs a change-of-reference processing operation to convert the measurements into the frame of reference of the head.

Figure 11:
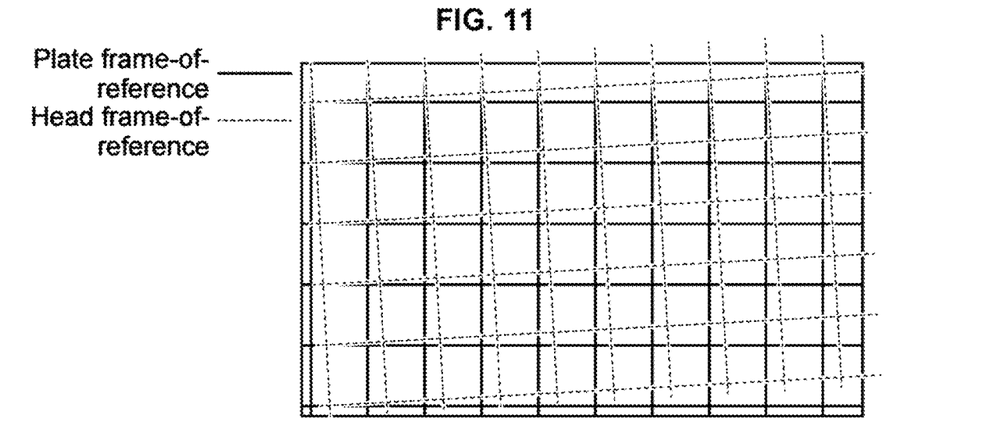
FIGS. 11 to 14 illustrate the processing used to convert from the frame of reference of the plate to the frame of reference of the head.

FIG. 11 illustrates, in an exaggerated fashion, the translational and rotational offsets there might be between the two frames of reference.

Figure 12:
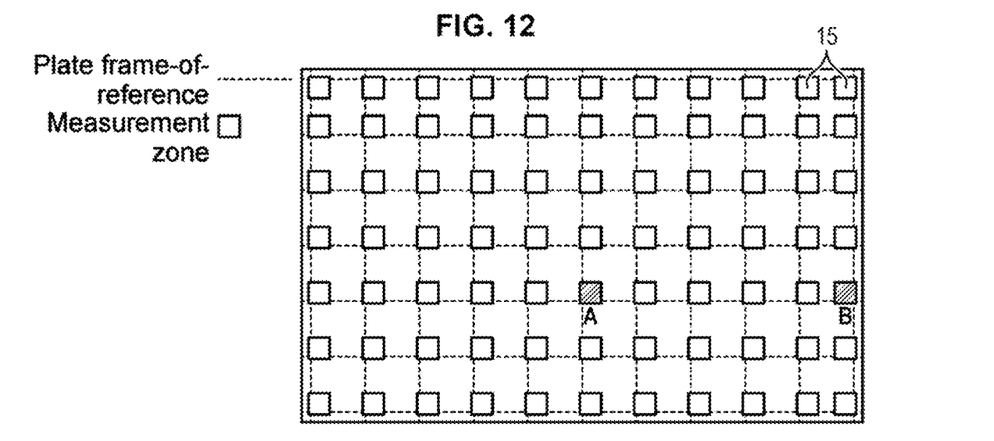

In order to evaluate the translational offset, the centre (midpoint) of one of the patterns is used as a point of reference (point A in FIG. 12).

This point is preferably chosen as being situated under the source head (coordinates (0,0) in bits of the galvanometers that control the head in X and in Y).

The image processing corresponding to the reference mark 10 allows the processor to determine the position Xm0 and Ym0 of the corresponding point in the frame of reference of the plate and from that deduce the translational correction to be applied to the measurements in order to convert them into the frame of reference of the head.

In order to evaluate the rotational offset, the processor 13 uses the patterns corresponding to the point A and to a second firing point (point B in FIG. 12) theoretically situated on the same line in X as point A.

Because the mirror control Y is zero for these two positions, the vector connecting these two points is therefore the horizontal of the frame of reference of the head.

Figure 13:
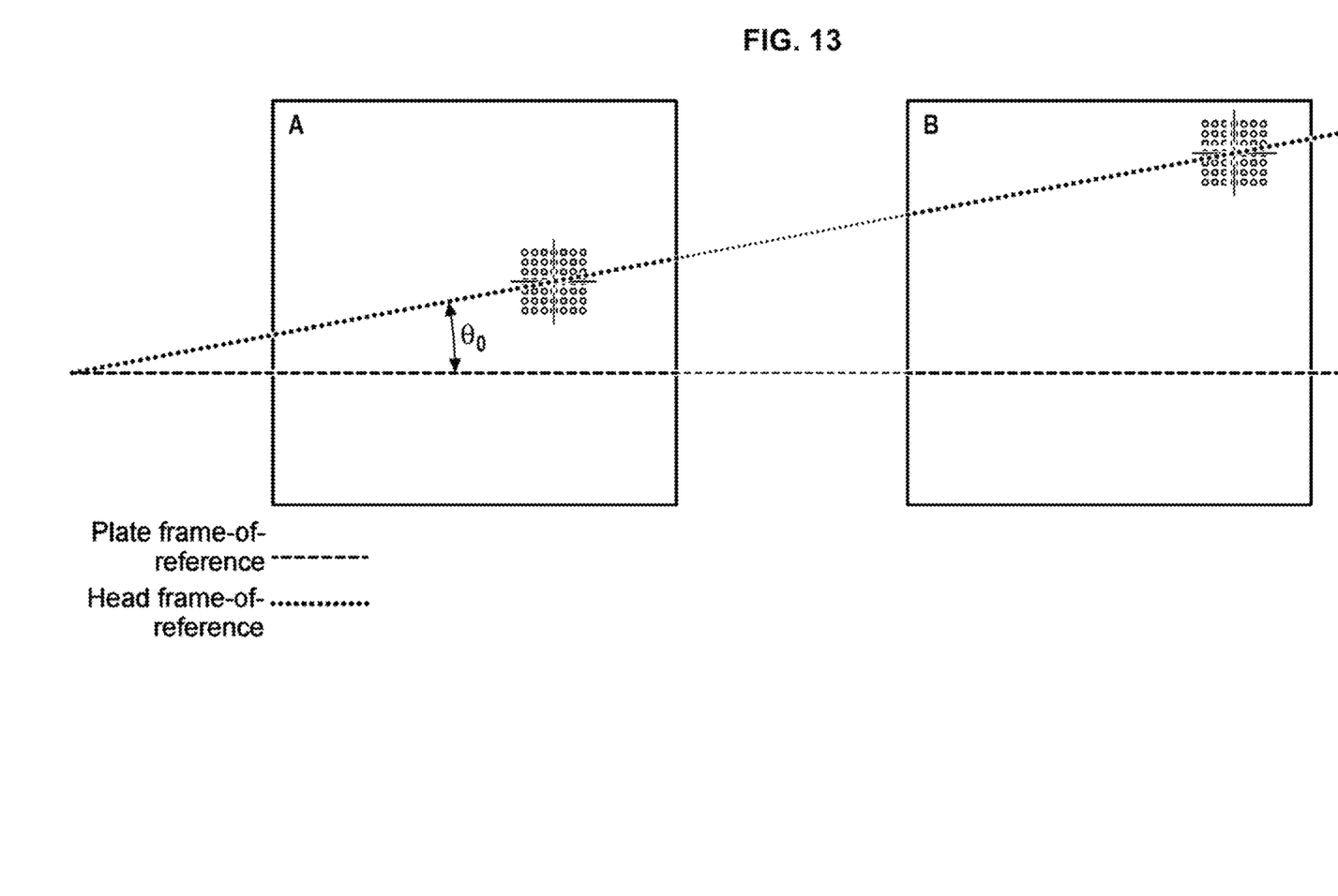

The position of point B in the frame of reference of the plate 7 allows the processor to determine the angle $\theta 0$ between the frame of reference of the plate and the frame of reference of the head system S (FIG. 13).

Using these parameters, the processor 13 performs the desired frame-of-reference conversion for all of the recorded images.

Thus, for each measured point with coordinates Xm and Ym, it determines the corresponding coordinates Xmt and Ymt in the frame of reference of the head system.

These measurements are then processed in order to obtain the values of corrections, in bits, for the control (in X and in Y) of the movements of the two mirrors.

Figure 14:
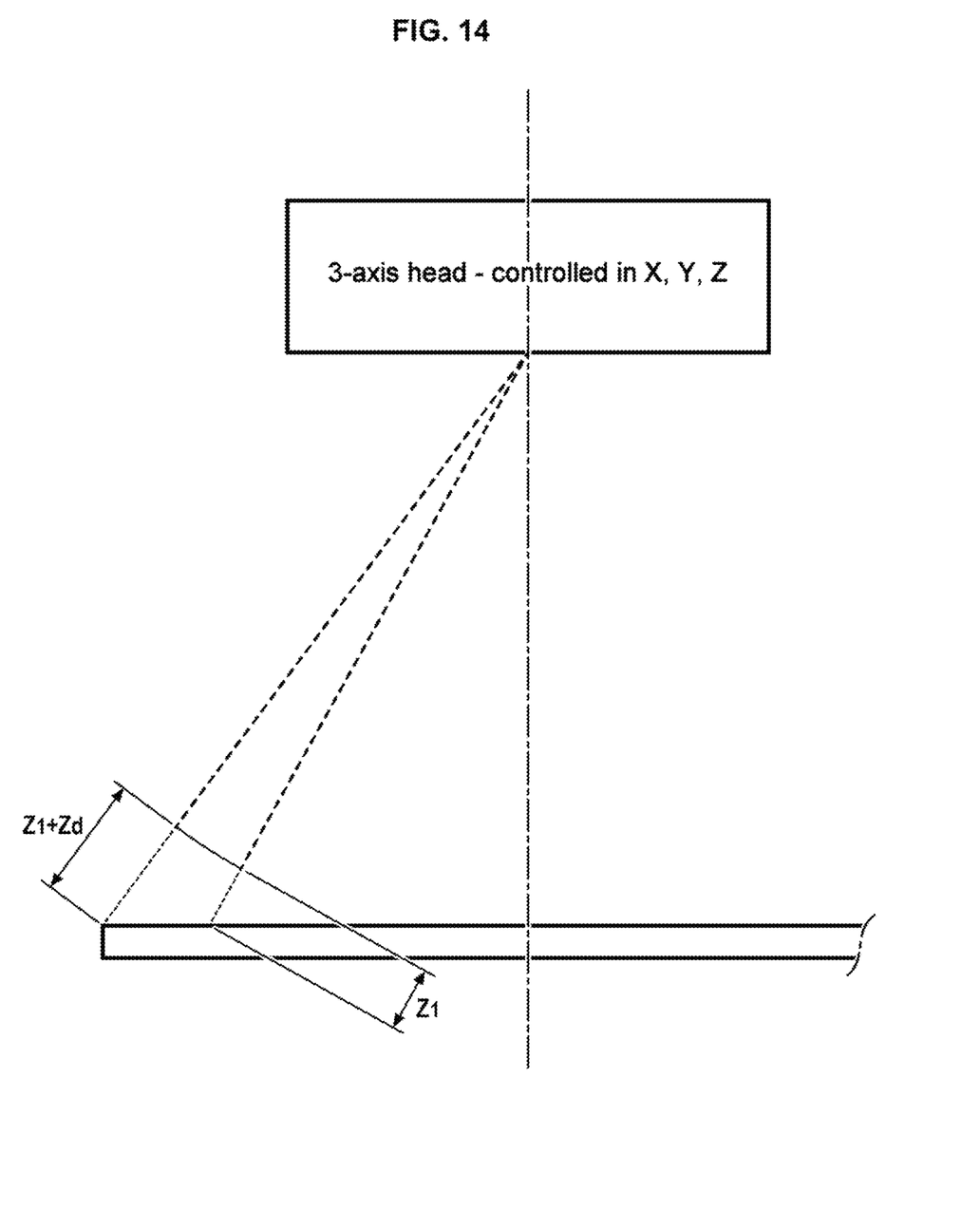

This correction in X and in Y in itself gives rise to a shift of the point of impact on the plate 7 and therefore to a variation in focus (variation corresponding to Zd in FIG. 14). The processor 13 estimates this variation Zd using the laws of optics and determines the corresponding value in galvanometer bits (ΔZd).

For each pattern 15 on the support 8 (namely for each calibration point), this correction is added to the correction in bits ΔZm determined by the processor 13 for the pattern concerned, in order from that to deduce the correct value for calibration in Z.

When the corrections have been established, the processor 13 stores the new correction table in memory.

The device is then ready for a check firing (step 26).

Once the correction table has thus been obtained, the firing support 8 is turned over and the operator initiates a fresh sequence of check firings.

The position of the impacts (firing patterns) on the firing support 8 is recorded and further corrections are determined by the processor 13.

A test report may be issued, if appropriate.

If the checking test reveals that the positional and focusing precision is insufficient with respect to the expected precision, a new correction table may be calculated, followed by a new check firing.

The process is thus repeated iteratively until the calibration is considered to be sufficient to meet the expected positioning tolerances.

The invention claimed is:

1. An additive manufacturing device comprising a power radiation source having a head system, a controller, and a kit configured for the calibration of the head system of the power radiation source of the additive manufacturing device, the kit comprising:
    a calibration plate having a plurality of reference marks; and
    a firing support made from at least one material sensitive to a radiation of the power radiation source, the firing support leaving the plurality of reference marks of the calibration plate visible when the firing support is in place on the calibration plate,
    wherein the firing support comprises a plurality of windows distributed in such a way as to become superposed with the plurality of reference marks of the calibration plate and leave them visible when the firing support is in place on the calibration plate,
    wherein the controller is configured to control the power radiation source and the head system in such a way as to perform on the firing support, for each reference mark of the calibration plate, a firing at a given theoretical target position in the vicinity of the corresponding reference mark, the firing being performed as a succession of several firing points, wherein the several firing points are distributed along a predefined firing pattern,
    wherein the additive manufacturing device further comprises:
        an optical measurement equipment configured to take an image of each performed succession of several firing points; and
        a processor configured to: process the image of each performed succession of several firing points taken by the optical measurement equipment in order to deduce a position of a midpoint of each performed succession of several firing points, compare the position of the midpoint of each performed succession of several firing points with the corresponding theoretical target position, and calculate correction values for the calibration of the head system according to said comparisons, and
    wherein the controller is configured to receive the correction values and to control the head system based on the correction values.

2. The additive manufacturing device according to claim 1, wherein the plurality of reference marks is distributed over the entirety of the calibration plate, and the firing support has dimensions which correspond to the calibration plate.

3. The additive manufacturing device according to claim 1, wherein the optical measurement equipment is mobile and is configured to move over the firing support.

4. The additive manufacturing device according to claim 3 further comprising a support on which the mobile optical measurement equipment is intended to be mounted, the support comprising dual-axis rails.

5. The additive manufacturing device according to claim 1, wherein a number of the plurality of reference marks on the calibration plate is equal to 65×65 or less.

6. An additive manufacturing device comprising a power radiation source having a head system, a controller, and a kit configured for the calibration of the head system of the power radiation source of the additive manufacturing device, the kit comprising:
    a calibration plate having a plurality of reference marks; and
    a firing support made from at least one material sensitive to a radiation of the power radiation source, the firing support leaving the plurality of reference marks of the calibration plate visible when the firing support is in place on the calibration plate,
    wherein the firing support comprises a plurality of windows distributed in such a way as to become superposed with the plurality of reference marks of the calibration plate and leave them visible when the firing support is in place on the calibration plate,
    wherein the controller is configured to control the power radiation source and the head system in such a way as to perform on the firing support, for each reference mark of the calibration plate, a firing at a given theoretical target position in the vicinity of the corresponding reference mark, the firing being performed as a succession of several firing points, wherein some of the several firing points are generated with different focus controls,
    wherein the additive manufacturing device further comprises:
        an optical measurement equipment configured to take an image of each performed succession of several firing points; and
        a processor configured to: process the image of each performed succession of several firing points taken by the optical measurement equipment in order to deduce a position of a midpoint of each performed succession of several firing points, compare the position of the midpoint of each performed succession of several firing points with the corresponding theoretical target position, and calculate correction values for the calibration of the head system according to said comparisons, and wherein the controller is configured to receive the correction values and to control the head system based on the correction values.

7. The additive manufacturing device according to claim 6, wherein the plurality of reference marks is distributed over the entirety of the calibration plate, and the firing support has dimensions which correspond to the calibration plate.

8. The additive manufacturing device according to claim 6, wherein the optical measurement equipment is mobile and is configured to move over the firing support.

9. The additive manufacturing device according to claim 8, further comprising a support on which the mobile optical measurement equipment is intended to be mounted, the support comprising dual-axis rails.

10. The additive manufacturing device according to claim 6, wherein a number of the plurality of reference marks on the calibration plate is equal to 65×65 or less.

* * * * *